United States Patent
Teskey

(10) Patent No.: US 12,118,645 B2
(45) Date of Patent: Oct. 15, 2024

(54) GENERATING MICROSTRUCTURES FOR MATERIALS BASED ON MACHINE LEARNING MODELS

(71) Applicant: VOLKSWAGEN AKTIENGESELLSCHAFT, Wolfsburg (DE)

(72) Inventor: Wesley Teskey, Foster City, CA (US)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 174 days.

(21) Appl. No.: 17/553,524

(22) Filed: Dec. 16, 2021

(65) Prior Publication Data

US 2023/0196629 A1  Jun. 22, 2023

(51) Int. Cl.
*G06T 11/00* (2006.01)
*G06N 3/04* (2023.01)
*G06N 3/045* (2023.01)
*G06T 7/00* (2017.01)

(52) U.S. Cl.
CPC .............. *G06T 11/00* (2013.01); *G06N 3/045* (2023.01); *G06T 7/0004* (2013.01); *G06T 2207/20084* (2013.01)

(58) Field of Classification Search
CPC .................. G06T 11/00; G06T 7/0004; G06T 2207/20084
USPC ........................................................... 345/441
See application file for complete search history.

(56) References Cited

U.S. PATENT DOCUMENTS

| | | | |
|---|---|---|---|
| 10,422,837 B2* | 9/2019 | Park | G01R 31/367 |
| 2019/0278880 A1* | 9/2019 | Ma | G06N 3/08 |
| 2021/0357555 A1* | 11/2021 | Liu | G06F 30/27 |
| 2022/0074994 A1* | 3/2022 | Senn | G01R 31/367 |
| 2023/0051237 A1* | 2/2023 | Souly | G06N 3/08 |
| 2023/0194614 A1* | 6/2023 | Negoita | B60L 58/12 |
| 2023/0196629 A1* | 6/2023 | Teskey | G06T 11/00 345/441 |

OTHER PUBLICATIONS

Wang et al., "Battery Grouping Based on Dynamic Gaussian Mixture Model", Conference Paper—Dec. 2018, 2018 IEEE 4th International Conference on Computer and Communications, pp. 2635-2640.

Lee et al., "Virtual microstructure design for steels using generative adversarial networks", Engineering Reports, 2021, https:/doi-org/10.1002/eng2.12274, pp. 1-14.

* cited by examiner

*Primary Examiner* — Javid A Amini

(57) ABSTRACT

In one embodiment, a method is provided. The method includes determining a set of spheres for a volume of a material. The volume of the material comprises the set of spheres and additional materials. The sizes of the set of spheres are based on a Gaussian mixture model (GMM). The method also includes determining a set of locations for the set of spheres within the volume of the material. The method further includes generating a set of images of the volume of the material based on a first generative adversarial network and a second generative adversarial network. The set of images depict a microstructure of the volume of material.

20 Claims, 7 Drawing Sheets

GENERATING MICROSTRUCTURES FOR MATERIALS BASED ON MACHINE LEARNING MODELS

TECHNICAL FIELD

Aspects of the present disclosure relate to generating microstructures, and more particularly, to generate microstructures for materials based on machine learning models.

BACKGROUND

Various different materials (e.g., metals, alloys, polymers, ceramics, composites, etc.) can be used for various different purposes and/or applications. For example, a material may be used in a battery (e.g., an electric vehicle (EV) battery). All materials have a microstructure. The microstructure may be the small scale structure of a material. For example, the microstructure or a material may be the structure of a prepared surface of material as viewed by a microscope above a threshold magnification (e.g., at 25 times magnification or higher).

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
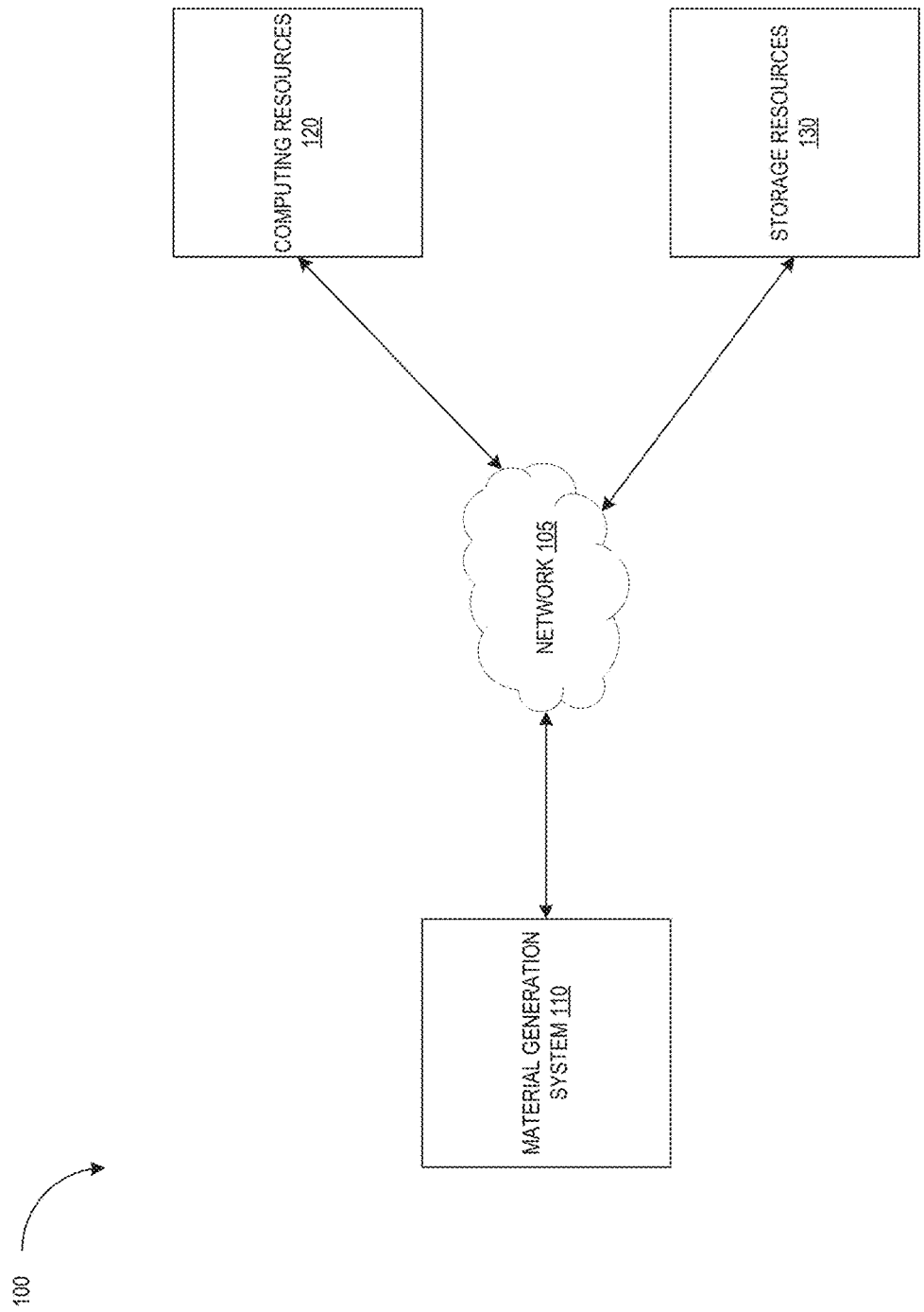
FIG. 1 is a block diagram that illustrates an example system architecture, in accordance with one or more embodiments of the present disclosure.

As discussed above, all materials (e.g., metals, alloys, polymers, ceramics, composites, etc.) have a microstructure. The microstructure of a material may be the small scale structure of a material. The microstructure of a material (such as metals, polymers, ceramics or composites) may influence and/or affect various properties of the material (e.g., physical properties, chemical properties, etc.). Such properties may include an amount of power that can be provided by the material, an amount of energy that can be stored by the material, specific power, specific energy, strength, toughness, corrosion resistance, high/low temperature behavior ductility, hardness, wear resistance, etc.

Creating, generating, constructing, etc., a new material is often a manual process performed by specialists/experts. For example, determining the amount of active material, binder material, and electrolyte material for a new material (that may be used in a battery or other energy/power storage device) is often done via experimentation and/or finite element analysis (FEA). In addition, determining the placement of various types of material is also done via experimentation and/or FEA. Determining the amount and/or placement of materials may be referred to as determining the microstructure of a material. Generating a new material and/or a new microstructure for a material may be a challenging and/or expensive process. In addition, generating new materials (e.g., new microstructures) is a time consuming process, which makes it even more difficult to generate and test out new materials quickly within a given time period.

The examples, implementations, and embodiments described herein may help address these issues, among others, when determining the properties of various materials (e.g., material properties). In one embodiment, a material generation system may use a Gaussian mixture model (GMM) to determine a set of spheres that may be included in a volume of a new material. The spheres may represent an active material (e.g., an active material of the battery). The material science system may use machine learning models (e.g., generative adversarial networks (GANs)) to determine locations for additional material (e.g., binder material, electrolyte material, etc.). In some embodiments, the material generation system may automatically generate images of the microstructure of a material.

In one embodiment, the material generation system may simplify or streamline the process of generating, creating, designing, etc., new materials with new microstructures. For example, rather than using a manual experimentation process or finite element analysis (FEA) performed by experts/specialists, the material generation system may apply machine learning models to generate images of new materials (e.g., to generate images of the microstructure of a material). The use of transformer networks (in the material generation system) may also allow the material generation system to generate new materials much more quickly, efficiently, and with less expense than previous processes/methods for creating new materials.

FIG. 1 is a block diagram that illustrates an example system architecture 100, in accordance with some embodiments of the present disclosure. The system architecture 100 includes network 105, a material generation system 110, computing resources 120, and storage resources 130. Network 105 may interconnect the material generation system 110, the computing resources 120, and/or the storage resources 130. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a wireless fidelity (Wi-Fi) hotspot connected with the network, a cellular system, and/or a wireless carrier system that can be implemented using various data processing equipment, communication towers (e.g. cell towers), etc. Network 105 may carry communications (e.g., data, message, packets, frames, etc.) between the material generation system 110, the computing resources 120 and/or the storage resources 130.

The computing resources 120 may include computing devices which may include hardware such as processing devices (e.g., processors, central processing units (CPUs), processing cores, graphics processing units (GPUS)), memory (e.g., random access memory (RAM), storage devices (e.g., hard-disk drive (HDD), solid-state drive (SSD), etc.), and other hardware devices (e.g., sound card, video card, etc.). The computing devices may comprise any suitable type of computing device or machine that has a programmable processor including, for example, server computers, desktop computers, rackmount servers, etc. In some examples, the computing devices may include a single machine or may include multiple interconnected machines (e.g., multiple servers configured in a cluster, cloud computing resources, etc.).

The computing resources 120 may also include virtual environments. In one embodiment, a virtual environment may be a virtual machine (VM) that may execute on a hypervisor which executes on top of the OS for a computing device. The hypervisor may also be referred to as a virtual machine monitor (VMM). A VM may be a software implementation of a machine (e.g., a software implementation of a computing device) that includes its own operating system (referred to as a guest OS) and executes application programs, applications, software. The hypervisor may be a component of an OS for a computing device, may run on top of the OS for a computing device, or may run directly on host hardware without the use of an OS. The hypervisor may manage system resources, including access to hardware devices such as physical processing devices (e.g., processors, CPUs, etc.), physical memory (e.g., RAM), storage device (e.g., HDDs, SSDs), and/or other devices (e.g., sound cards, video cards, etc.). The hypervisor may also emulate the hardware (or other physical resources) which may be used by the VMs to execute software/applications. The hypervisor may present other software (i.e., "guest" software) the abstraction of one or more virtual machines (VMs) that provide the same or different abstractions to various guest software (e.g., guest operating system, guest applications). A VM may execute guest software that uses an underlying emulation of the physical resources (e.g., virtual processors and guest memory).

In another embodiment, a virtual environment may be a container that may execute on a container engine which executes on top of the OS for a computing device, as discussed in more detail below. A container may be an isolated set of resources allocated to executing an application, software, and/or process independent from other applications, software, and/or processes. The host OS (e.g., an OS of the computing device) may use namespaces to isolate the resources of the containers from each other. A container may also be a virtualized object similar to virtual machines. However, a container may not implement separate guest OS (like a VM). The container may share the kernel, libraries, and binaries of the host OS with other containers that are executing on the computing device. The container engine may allow different containers to share the host OS (e.g., the OS kernel, binaries, libraries, etc.) of a computing device. The container engine may also facilitate interactions between the container and the resources of the computing device. The container engine may also be used to create, remove, and manage containers.

The storage resources 130 may include various different types of storage devices, such as hard disk drives (HDDs), solid state drives (SSD), hybrid drives, storage area networks, storage arrays, etc. The storage resources 130 may also include cloud storage resources or platforms which allow for dynamic scaling of storage space.

Although the computing resources 120 and the storage resources 130 are illustrated separate from the material generation system 110, one or more of the computing resources 120 and the storage resources 130 may be part of the material generation system 110 in other embodiments. For example, the material generation system 110 may include both the computing resources 120 and the storage resources 130.

In one embodiment, the material generation system 110 may determine a set of spheres for a volume of material (e.g., for a new material or new microstructure). The material generation system 110 may use a Gaussian mixture model (GMM) to determine the set of spheres based on a statistical distribution (e.g., one or more normal distributions for the sizes/diameters of the spheres), as discussed in more detail below. The material generation system 110 may also determine locations for each sphere within the set of spheres, as discussed in more detail below. For example, the material generation system 110 may displace (e.g., move, dispose, relocate, etc.) spheres from an initial location to another location based on various parameters or criteria. The material generation system 110 may also generate a set of images of the material (e.g., of the microstructure) based on multiple generative adversarial networks, as discussed in more detail below.

In one embodiment, the set of images may depict different cross-sections of the 3-D volume of material (e.g., different slices of the material). For example, each image of the set or sequence of images may depict a cross-section of a cube of material at a particular depth. The depth of the cross-section of the cube of material may start from the one side of the material (start at the top, start at the left, etc.) to the opposite side of the material (going towards the bottom, going towards the right, etc.), or vice versa.

As discussed above, generating, creating, developing, etc., new materials may be a challenging, time consuming, and/or expensive process that is often performed manually by experts/specialists. The examples, implementations, and embodiments described herein may help address these issues by using machine learning models to generate microstructures for new materials. The material generation system 110 may use a GMM to determine or identify a set of spheres that match a distribution (e.g., a standard distribution) of sphere sizes. The material generation system 110 may then dispose the spheres within a volume of the new material and may displace the spheres to different locations based on different parameters/criteria (e.g., based on overlaps between spheres, based on proximity to a center of the volume, etc.). The generation of new materials (e.g., generating the microstructures of the new materials) may be performed much more quickly when compared with using finite element analysis (FEA) and/or experimentation (e.g., real or physical experimentation). For example, rather than generating tens of new materials with FEA within a time period, material generation system 110 may be able to generate thousands or millions of different new materials (with different microstructures) within the same time period. This may allow new materials to be developed, created, etc., more quickly and efficiently.

Figure 2:
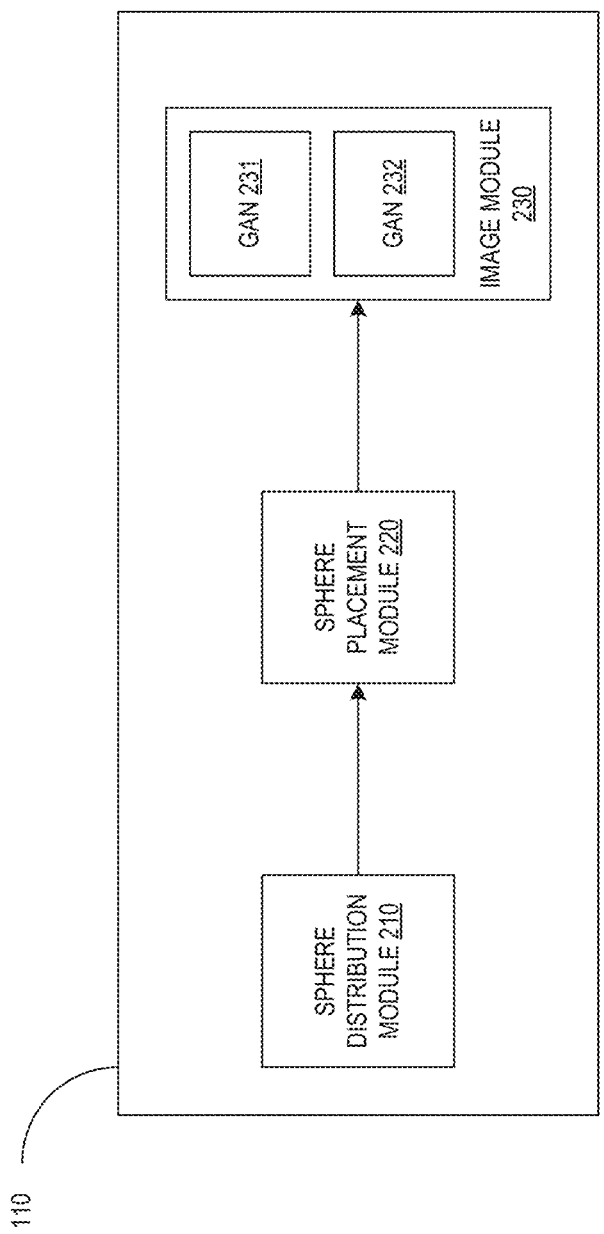
FIG. 2 is a diagram illustrating an example material generation system, in accordance with one or more embodiments of the present disclosure.

FIG. 2 is a diagram illustrating an example material generation system 110, in accordance with one or more embodiments of the present disclosure. The material generation system 110 includes a sphere distribution module 210, a sphere placement module 220, and an image module 230 As discussed above, the material generation system 110 may generate images of a material (e.g., images of the microstructure of a volume of material). The images of the material may represent a potential/candidate material that may be used for one or more purposes (e.g., to store energy in a battery, encase a battery pack, etc.). Each of the sphere distribution module 210, the sphere placement module 220, and the image module 230 may be a combination of hardware, software, and firmware. In addition, any of the sphere distribution module 210, the sphere placement module 220, and the image module 230 may be distributed over multiple computing devices.

In one embodiment, the volume of material (e.g., the microstructure of the material depicted by the images generated by the material generation system 110) may include different types of material. For example, the volume of material may include a set of spheres (e.g., one or more spheres). The set of spheres may represent an active material. The volume of material may also include electrolyte material and/or binder material. The spheres, active material, binder material, and electrolyte material depicted by each image (e.g., the spheres, active material, and electrolyte material in each slice of the volume of the material) may be referred to as microfeatures of the material.

In one embodiment, the sphere distribution module 210 may determine the set of spheres for a volume of material. The sphere distribution module 210 may use a Gaussian mixture model (GMM) to determine the set of spheres. For example, the sphere distribution module 210 may use the Gaussian mixture model to depict statistical properties of the set of spheres, using multivariate Gaussian distributions. The statistical properties may include the sizes (e.g., diameters, circumferences, volume, etc.) of the spheres within the set of spheres. In one embodiment, the sizes of the spheres may be represented by one or more normal distributions (e.g., bell curves where the X-axis represents the size/diameter of a sphere and the Y-axis represents how many spheres within the set have a particular size/diameter, or vice versa).

In one embodiment, the sphere placement module 220 may determine a set of locations with the volume of the material for the set of spheres. For example, the sphere placement module 220 may determine a location for each sphere within the volume. The sphere placement module 220 may select a set of initial locations for the set of spheres non-deterministically (e.g., randomly). After selecting the set of initial locations, the sphere placement module 220 may displace one or more of the spheres from their initial locations to a different location based on various parameters, criteria, etc.

In one embodiment, the sphere placement module 220 may displace spheres that overlap each other by more than a threshold amount/distance. For example, the sphere placement module 220 may displace a sphere that overlaps another sphere by more than two microns, 10 microns, or some other appropriate distance. The sphere placement module 220 may displace all of the overlapping spheres (e.g., displace both spheres if there are two overlapping spheres) or may displace a subset of the overlapping spheres (e.g., displace only one sphere if there are two overlapping spheres).

In one embodiment, the sphere placement module 220 may displace one or more spheres from the one or more initial locations towards a central portion (e.g., a center) of the volume of the material. For example, the sphere placement module 220 may try to place spheres closer to the center of a cube of the material.

In one embodiment, the sphere placement module 220 may place sphere between two or more other spheres. For example, if there is enough space between two spheres to fit a smaller sphere, the sphere placement module 220 may displace that smaller sphere from its initial location to a location between the two spheres. This may allow the sphere placement module 220 to pack the spheres closer together within the volume of material.

Although certain methods of displacing and/or disposing spheres at different locations are described herein, other embodiments may use other algorithms, functions, operations, etc., for displacing and/or disposed spheres. For example, various sphere packing algorithms may be used in other embodiments.

In one embodiment, the image module 230 may generate a set of images of the volume of material based on the generative adversarial network (GAN) 231 and GAN 232. For example, the volume of material may include the set of spheres (selected by the sphere distribution module 21) and disposed within the volume (by the sphere placement module 220). Slices of the volume may be obtained and the images of the slices may be generated. For example, a cube of the material (e.g., a volume of the material) may be divided into one hundred, one thousand, or some other appropriate number of slices. Each slice may be depicted, represented, etc., by a corresponding image. The images of the slices (which may depict only the spheres at this point) may be provided to the GANs 231 and 232.

In one embodiment, the images of the slices of the volume may be provided to the GANs 231 and 232. The GANs 231 and 232 may use the images of the slices to generate images of the volume of material that depict the spheres along with additional material, such as binder material and/or electrolyte material. The spheres and additional material (e.g., the size, location, shape, etc., of the spheres and/or additional material) depicted in the images of the slices, may be referred to as the microstructure of the material.

In one embodiment, the GAN 231 may generate a first subset of the set of images of the volume of material. For example, the GAN 231 may generate images for the first few slices of the volume (e.g., may generate images for the first 2-3 slices of the volume) using the first few slices of the volume that includes only the spheres (e.g., without the additional material). For example, the GAN 231 may use images of the first few slices with only the spheres and may add the additional material to the first few slices/images. The first subset of the set of images may be referred to as an initial set of images or a first subset of images. The first subset of images may depict spheres and additional materials within the first few slices of the volume of material. For example, the first subset of images image may depict the slices of the volume which include one or more spheres and binder material around the one or more spheres, as well as electrolyte material between the one or more spheres.

In one embodiment, the GAN 232 may generate a second subset of the set of images (e.g., the rest/remaining portion of the set of images) based on the initial set of images. For example, based on the locations of the additional material and the spheres in the initial set of images, the GAN 232 may generate the remaining images of the volume of material. Each of the remaining images of the volume of material may depict the remaining slices of the volume of material which include one or more spheres and binder material around the one or more spheres, as well as electrolyte material between the one or more spheres.

In one embodiment, each image generated by the GAN 232 may be based on a previously generated image. For example, each time the GAN 232 generates a current image, the GAN 232 may use a previous image as an input when generating the current image. The previous image may be generated by the GAN 231 or the GAN 232. For example, if the GAN 231 generates a first image and a second image (depicting two slices of the volume of material), GAN 232 may generate a third image (depicting a third slice of the volume of material) based on the second image. The GAN 232 may then generate a fourth image (depicting a fourth slice of the volume of material) based on the third image.

In one embodiment, the GAN 232 may generate the remaining images of the remaining slices of the volume sequentially. For example, The GAN 232 may start generate images for a slice X based on the image for slice X-1 (e.g., the previous image). The GAN 232 may continue to generate each current image based on the immediate preceding (e.g., previous) image. Although the disclosure may refer to the immediate preceding image, other previous images may be used in other embodiments. For example, if the current image is X, then the image X-4, or X-8 may be used to generate the current image.

As discussed above, the images generated by the GAN 232 include one or more spheres and additional material (such as electrolyte material and/or binder material). In one embodiment, the locations of the additional material in a current image generated by the GAN 232 may be based on previous locations of the additional material in the immediate preceding image. For example, with a previous image depicted additional material at a first location X-Y location (e.g., at a first Cartesian X-Y coordinate) within the image, the GAN 232 may generate the current image such that the additional material is depicted within a threshold distance of the first X-Y location (e.g., at a second Cartesian X-Y coordinate that is less than a threshold distance from the first Cartesian X-Y coordinate). This may allow the GAN 232 to generate images that are physically realistic because the locations of materials and/or spheres within the different slices/images will be located near or around previous locations of the materials and/or spheres.

In one embodiment, the GANs 231 and 232 may be conditional GANs. For example, the GANs 231 and 232 may be separate pix2pix GANs. Although the present disclosure may refer to materials such as spheres, active materials, electrolyte materials, binder materials, etc., the material generation system 110 may generate images of materials that include other types of materials. In addition, although the present disclosure may refer to a GMM and a standard distribution, other techniques, algorithms, functions, etc., may be used to determine a statistical distribution of spheres. Furthermore, although the present disclosure may refer to GANs, other types of machine learning models may be used to generate images (e.g., slices) of the volume of the material, in other embodiments.

Figure 3:
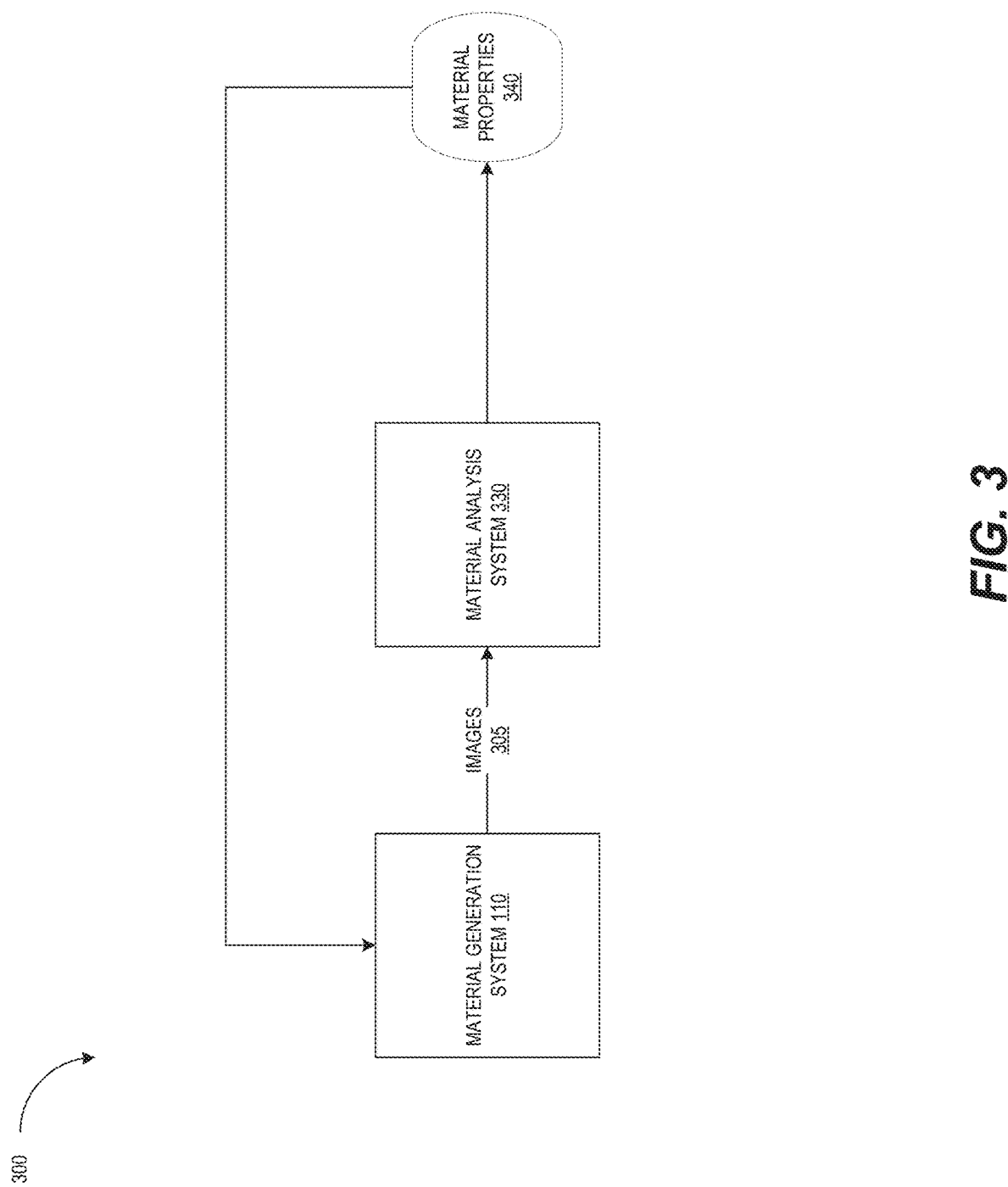
FIG. 3 is a diagram illustrating an example system architecture, in accordance with one or more embodiments of the present disclosure.

FIG. 3 is a diagram illustrating an example system architecture 300, in accordance with one or more embodiments of the present disclosure. The system architecture 300 includes a material generation system 110 and a material analysis system 330. As discussed above, the material generation system 110 may generate images 305 (e.g., slices) of a material or of the microstructure of the material (e.g., the spheres, electrolyte material, binder material, etc., of the material). The material generation system may generate the images based on a GMM and a set of GANs, as discussed above.

In one embodiment, the images 305 may be provided to the material analysis system 330. The material analysis system 330 may determine a set of material properties 340 for a material based on images of the microstructure of the material. For example, the material analysis system 330 may determine the specific power or specific energy of a material. The material analysis system 330 may be capable of determining the material properties for hundreds, thousands, etc., of material more quickly, efficiently, and/or automatically. For example, based on the images 305 (which may depict sequential slices of a volume or cube of the material), the material analysis system 330 may be able to determine various material properties 340 of the material. In some embodiments, the material analysis system 330 may use machine learning models and/or various algorithms, techniques, etc., to determine the various material properties.

In one embodiment, the material analysis system 330 may allow users to select possible or candidate materials that may be used for various applications, more quickly and/or more efficiently. For example, the material analysis system 330 may be used to determine the material properties of any number of materials (e.g., hundreds, thousands, or even millions of different types of material). The material analysis system 330 may allow users to identify materials that meet threshold criterion for certain material properties. For example, the material analysis system 330 may allow users to determine whether a material generated by the material generation system 110 has a specific power above a threshold specific power.

Various different properties may be determined, obtained, etc., by the material generation system. For example, the material analysis system 330 may determine an amount of power or energy the material may be able to store. In another example, the material analysis system 330 may determine an amount of power or energy the material may be able to discharge. In a further example, the material analysis system 330 may determine a specific energy of the material. In yet another example, the material analysis system 330 may determine a specific power of the material. Although the present disclosure may refer to certain properties of a material (e.g., power, energy, specific power, specific), the examples, implementations, aspects, and/or embodiments described herein may be used to determine other properties of a material (e.g., other physical and/or chemical properties).

In one embodiment, the material analysis system 330 may instruct and/or cause the material generation system 110 to generate additional materials (e.g., generate additional images of slices of the additional materials). For example, the material analysis system 330 may instruct the material generation system 110 to generate thousands, millions, etc., of materials (e.g., images of slices of the materials). The material analysis system 330 may select a subset of those materials that meet threshold criterion for certain material properties. The subset of materials may be provided to another system for finite element analysis to further evaluate the material properties of the material. From the subset of materials, a final set of materials may be selected for experimentation (e.g., for physical experimentation). For example, the final set of materials may be fabricated to perform a final evaluation of their material properties. This may allow new materials (for various purposes) to be developed more quickly, efficiently, and/or with less expense.

Figure 4:
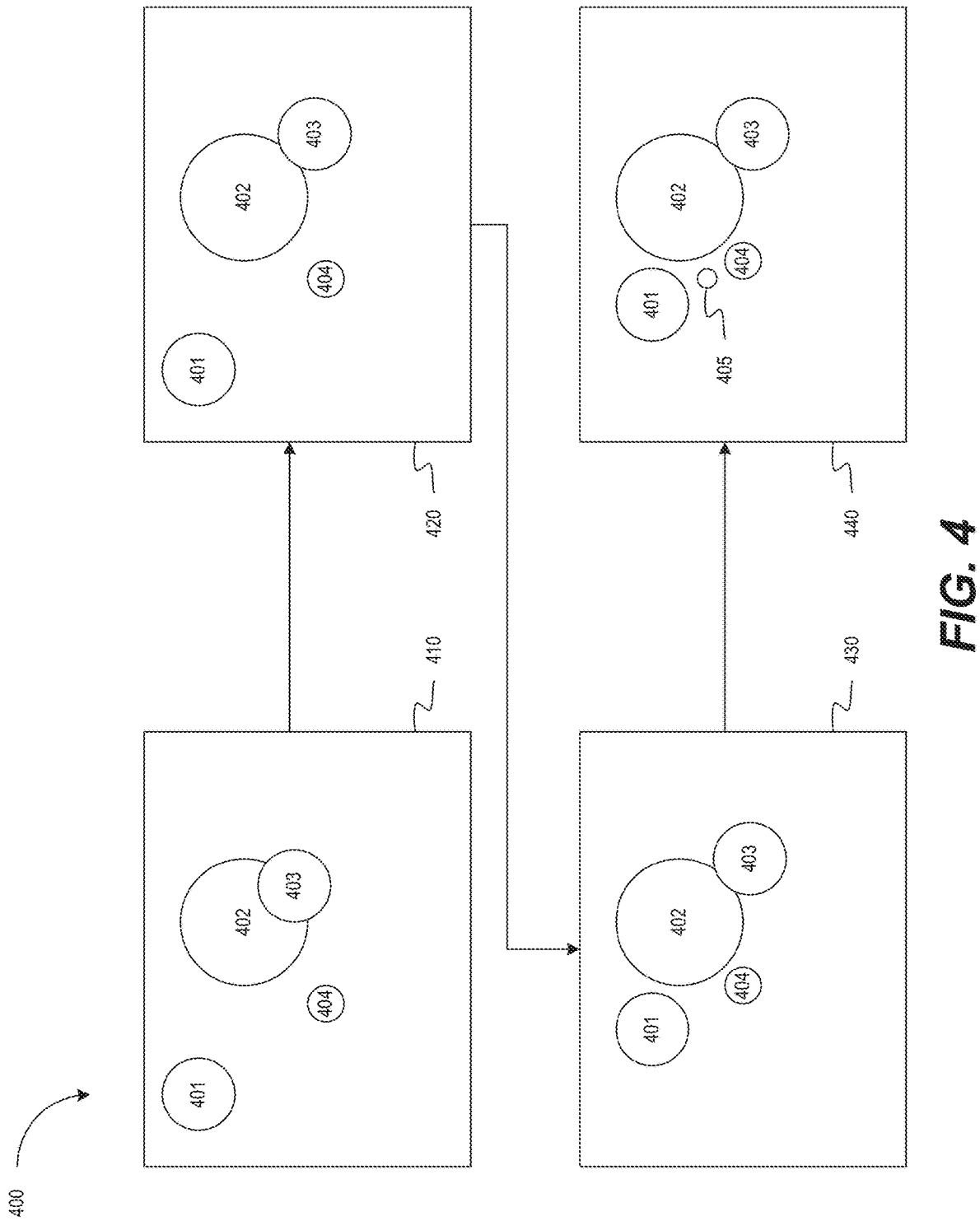
FIG. 4 is a diagram illustrating a process for disposing spheres within a volume of a material, in accordance with one or more embodiments of the present disclosure.

FIG. 4 is a diagram illustrating a process 400 for disposing spheres within a volume of a material, in accordance with one or more embodiments of the present disclosure. Although the spheres may be disposed and displaced to locations within a 3-dimensional (3D) volume, the spheres and their locations within the 3D volume of material are depicted as 2-dimensional (2D) images for convenience. The process 400 may be performed by a material generation system (e.g., material generation system 110 illustrated in FIGS. 1-2) and/or a sphere placement module (e.g., sphere placement module 220 illustrated in FIG. 2).

At block 410, spheres 401, 402, 403, and 404 are disposed within the volume of material at non-deterministic (e.g., random locations). As illustrated in block 410, the spheres 402 and 403 overlap. As discussed above, the sphere placement module may determine the amount of overlap between spheres 402 and 403. If the amount of overlap between spheres 402 and 403 is greater than a threshold distance (e.g., more than 3 microns or some appropriate distance/ amount of overlap), the sphere placement module may displace one or more of the spheres 402 and 403.

At block 420, the sphere 403 is displaced downward and toward the right because the amount of overlap between spheres 402 and 403 is greater than a threshold amount of overlap. Although sphere 403 is displaced to a different location in block 420, both sphere 402 and 403 can be displaced away from each other in other embodiments.

At block 430, some of the spheres are displaced closer towards the center of the volume of material. For example, sphere 401 is displaced downward and towards the right (e.g., towards the center, central portion, etc.). In another example, sphere 404 is displaced upwards and towards the right (e.g., towards the center, central portion, etc.).

At block 440, a sphere 405 is added between spheres 401 and 404. Based on the amount of distance between spheres 401 and 404, the sphere placement module may select sphere 405 from the set of spheres that has a diameter/size which will fit between spheres 401 and 404. This may allow the sphere placement module to pack the spheres (e.g., the active material) closer together. In one embodiment, the sphere placement module may displace sphere 405 from a previous (e.g., an initial location) when placing sphere 405 between spheres 401 and 404. In another embodiment, the sphere placement module may select sphere 405 from an unplaced set of spheres (e.g., spheres that have not been disposed or positioned with the volume of material). As discussed above, after performing process 400, the distribution of the sizes of the spheres (e.g., the amount of spheres of each size/diameter, the statistical properties, etc.) remains the same as the distribution determined by a sphere distribution module (e.g., determined based on a GMM).

Figure 5:
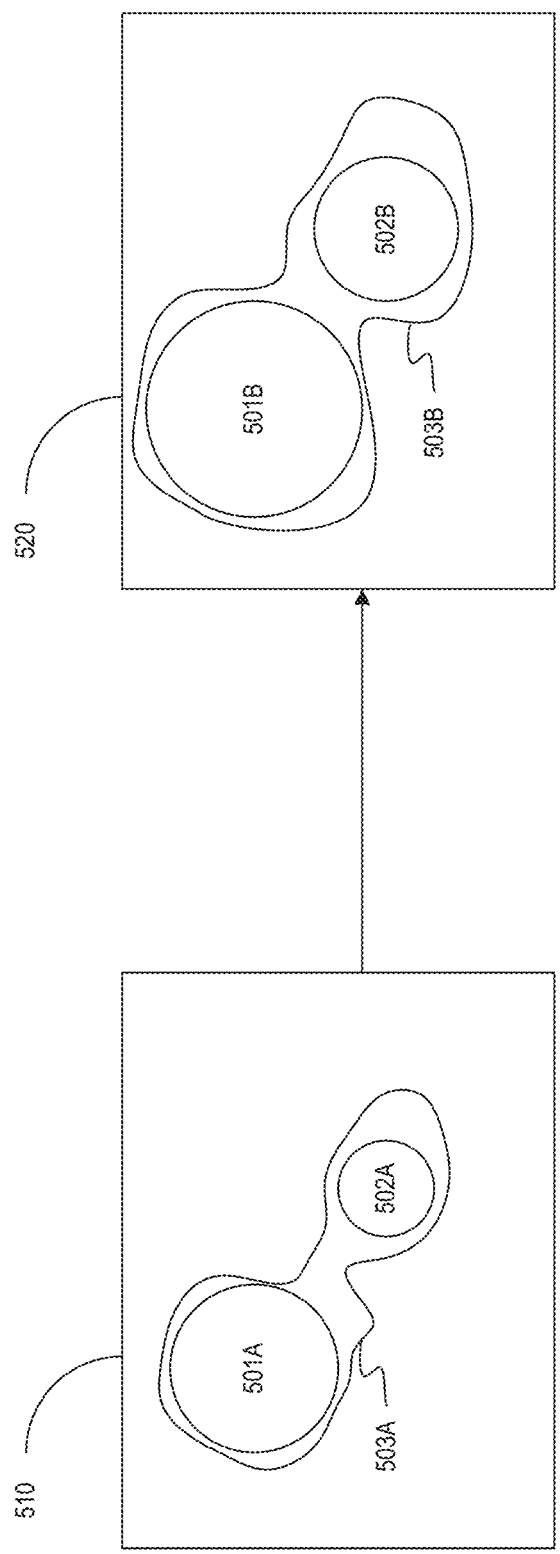
FIG. 5 is a diagram illustrating examples images that may be generated by a generative adversarial network, in accordance with one or more embodiments of the present disclosure.

FIG. 5 is a diagram illustrating examples images 510 and 520 that may be generated by a generative adversarial network, in accordance with one or more embodiments of the present disclosure. For example, the image 520 may be generated by GAN 232 and the image 510 may be generated by GAN 231 (illustrated in FIG. 2). In another example, both image 510 and image 520 may be generated by GAN 232 (illustrated in FIG. 2).

Images 510 and 520 depict the microstructure of a material (e.g., a new material). For example, image 510 depicts a sphere 510A, a sphere 502A and binder material 503A surrounding the spheres 510A and 502A. Image 520 depicts a sphere 510B, a sphere 502B and binder material 503B surrounding the spheres 510B and 502B. Image 510 may be a previously generated image and image 520 may be a current image generated by the GAN (e.g., GAN 232).

A discussed above, the locations of the binder material 503B (e.g., additional material) in the current image generated by the GAN may be based on previous locations of the binder material 503A in the immediate preceding image. For example, the previous image 510 depicted the binder material 503A around the spheres 501A and 502A (e.g., in an eight-shape surrounding the spheres 501A and 502A). The current image 520 also depicts the same spheres but at a different slice within the volume. For example, the sphere 501B is bigger than sphere 501A because the slice has moved along the length of the sphere. These same spheres are represented as spheres 501B and 502B in the current image 520. The binder material 503B is similar in size, shape, and/or location to the binder material 503A depicted in image 510. This may allow the GAN to generate images that are physically realistic because the locations, size, and/or shapes of materials and/or spheres within the different slices/images will be located near or around previous locations of the materials and/or spheres.

Figure 6:
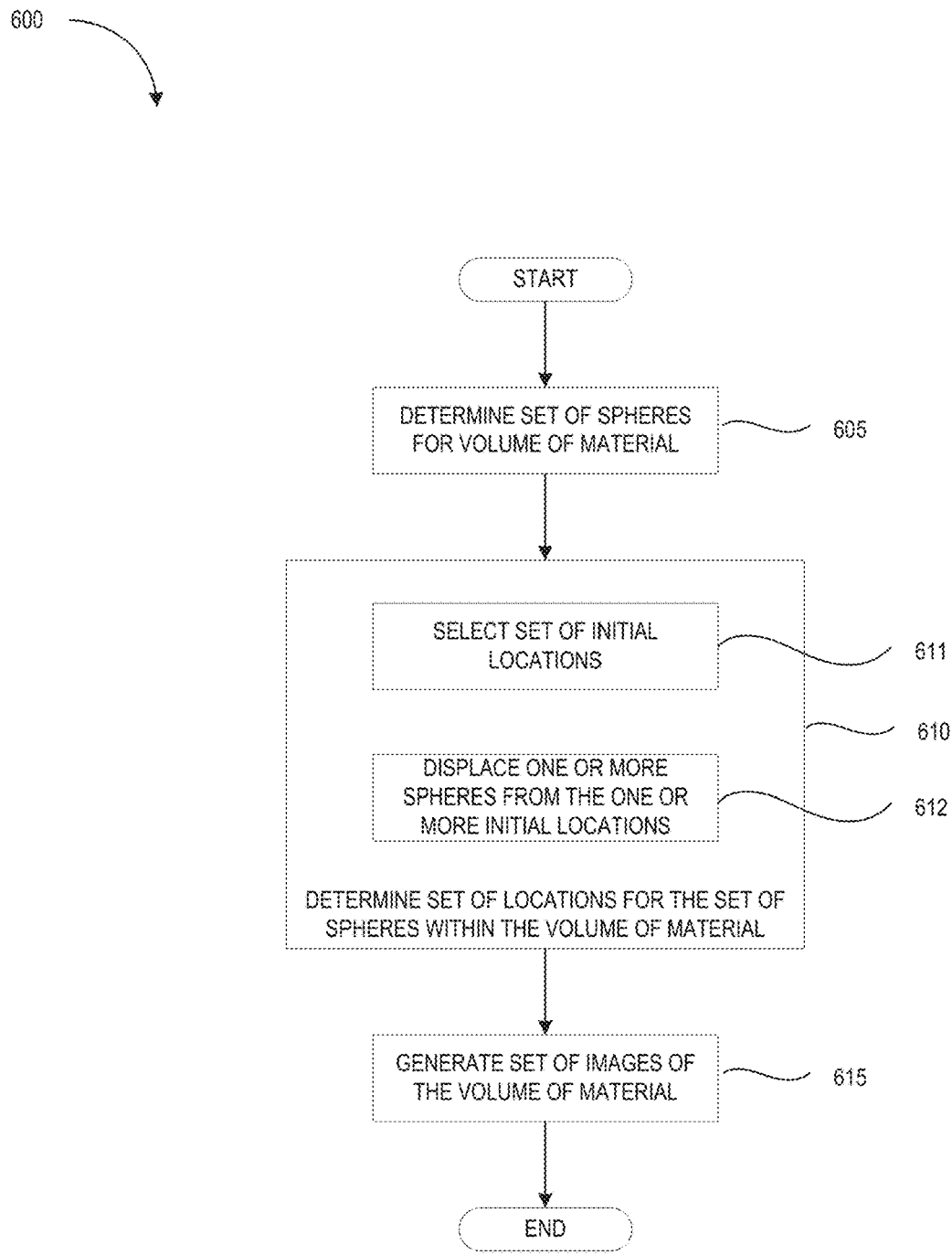
FIG. 6 is a flow diagram of a process for generating images of a material, in accordance with one or more embodiments of the present disclosure.

FIG. 6 is a flow diagram of a process 600 for generating images of a material, in accordance with one or more embodiments of the present disclosure. Process 600 may be performed by processing logic that may comprise hardware (e.g., circuitry, dedicated logic, programmable logic, a field programmable gate array (FPGA), an application specific integrated circuit (ASIC), a processor, a processing device, a central processing unit (CPU), a system-on-chip (SoC), etc.), software (e.g., instructions running/executing on a processing device), firmware (e.g., microcode), or a combination thereof. In some embodiments, the process 600 may be performed by one or more computing devices or computing systems (e.g., the material generation system 110, sphere distribution module 210, sphere placement module 220, image module 230, GAN 231, and/or GAN 232 illustrated in FIGS. 1-3).

The process 600 begins at block 605 where the process 600 determines a set of spheres for a volume of material. The process 600 may use a GMM to identify a set of spheres that satisfy one or more statistical properties. For example, the statistical properties may be represent using a normal distribution that indicates how many spheres of each different diameter are allowed within the set of spheres (e.g., 10 spheres that have a 10-micron diameter, 20 spheres that have a 15-micron diameter, etc.).

At block 610, the process 600 may determine a set of locations for the set of spheres within the volume of material. For example, the process 600 may determine where to dispose each of the spheres within the volume of material. As illustrated in FIG. 6, block 610 includes block 611 and 612. At block 611, the process 600 may select a set of initial locations for the set of spheres. The set of initial locations may be selected non-deterministically (e.g., randomly). After selecting the set of initial locations the process 600 may displace one or more spheres from the one or more initial locations. For example, the process 600 may displace one or more spheres that overlap each other by more than a threshold amount. In another example, the process 600 may displace spheres towards a central portion of the volume. In a further example, the process 600 may dispose a sphere in between other spheres (e.g., may dispose a sphere in the empty space between other spheres).

At block 615, the process 600 may generate a set of images of the volume of material. Each image may represent a slice of the volume of material. The process 600 may use multiple GANs to generate the set of images. For example, an initial set of images may be generated using a first GAN. The remaining images may be generated using a second GAN. The set of images may depict the microstructure of the material. For example, the set of images may depict the spheres, binder material, and/or electrolyte material that may be included in the volume of material. The second GAN may generate each image based on a previous image. For example, the second GAN may generate images sequentially, such that each current image being generated is based on the immediate preceding image generated by the second GAN.

Figure 7:
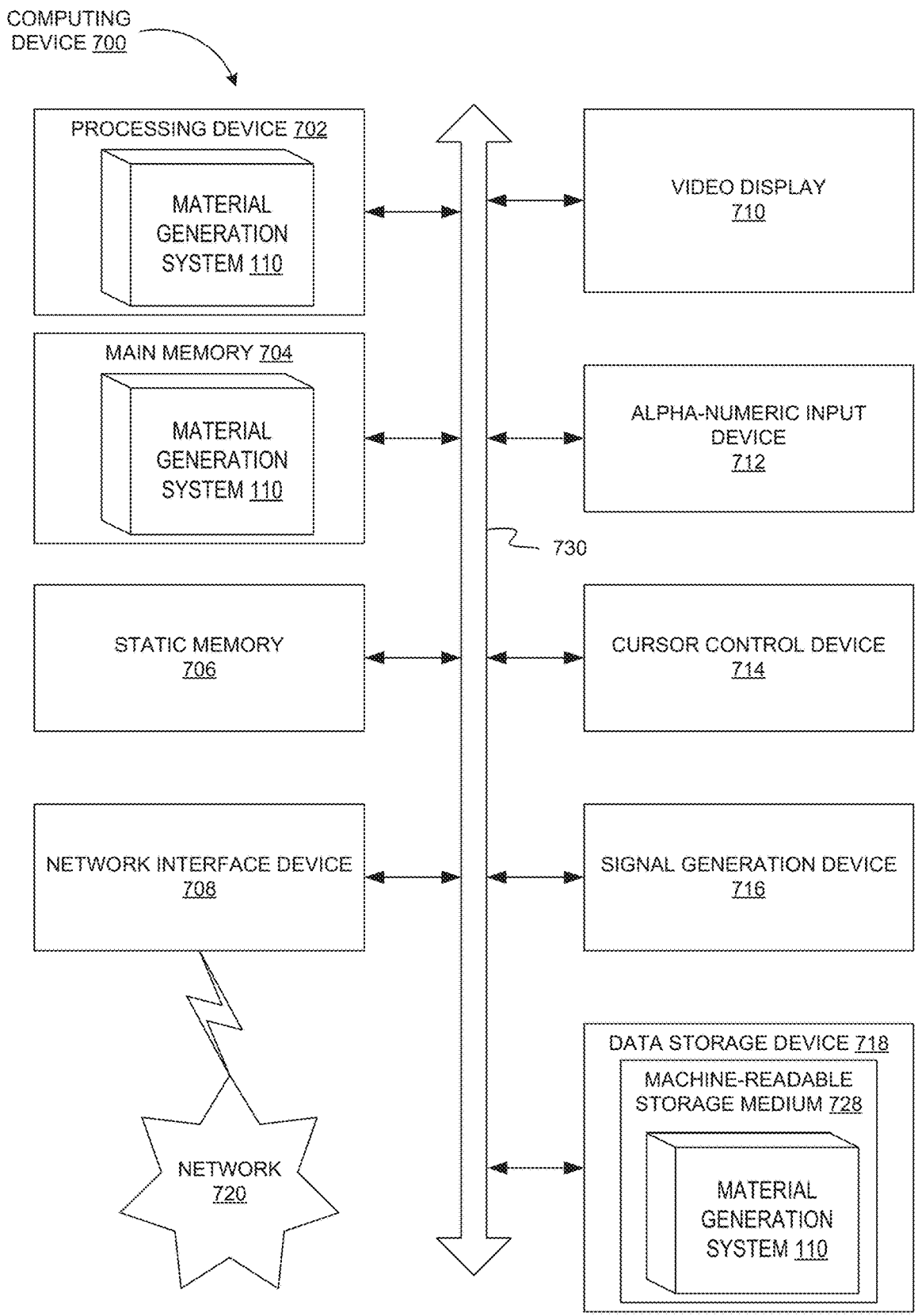
FIG. 7 is a block diagram of an example computing device that may perform one or more of the operations described herein, in accordance with some embodiments of the present disclosure.

FIG. 7 is a block diagram of an example computing device 700 that may perform one or more of the operations described herein, in accordance with some embodiments. Computing device 700 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 700 may include a processing device (e.g., a general purpose processor, a PLD, etc.) 702, a main memory 704 (e.g., synchronous dynamic random access memory (DRAM), read-only memory (ROM)), a static memory 706 (e.g., flash memory and a data storage device 718), which may communicate with each other via a bus 730.

Processing device 702 may be provided by one or more general-purpose processing devices such as a microprocessor, central processing unit, or the like. In an illustrative example, processing device 702 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 702 may also comprise one or more special-purpose processing devices such as an application specific integrated circuit (ASIC), a field programmable gate array (FPGA), a digital signal processor (DSP), network processor, or the like. The processing device 702 may be configured to execute the operations described herein, in accordance with one or more aspects of the present disclosure, for performing the operations and steps discussed herein.

Computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Data storage device 718 may include a computer-readable storage medium 728 on which may be stored one or more sets of instructions, e.g., instructions for carrying out the operations described herein, in accordance with one or more aspects of the present disclosure. Instructions implementing the different systems described herein (e.g., the material generation system 110, sphere distribution module 210, sphere placement module 220, image module 230, GAN 231, and/or GAN 232 illustrated in FIGS. 1-3) may also reside, completely or at least partially, within main memory 704 and/or within processing device 702 during execution thereof by computing device 700, main memory 704 and processing device 702 also constituting computer-readable media. The instructions may further be transmitted or received over a network 720 via network interface device 708.

While computer-readable storage medium 728 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "generating," "determining," "selecting," "displacing," "disposing," "providing," "obtaining," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

When an action, function, operation, etc., is described herein as being performed automatically, this may indicate that the action, function, operation, etc., may be performed without requiring human or user input, invocation, or interaction.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
    determining a set of spheres for a volume of a material, wherein:
        the volume of the material comprises the set of spheres and additional materials; and
        sizes of the set of spheres are based on a Gaussian mixture model (GMM);
    determining a set of locations for the set of spheres within the volume of the material;
    generating a set of images of the volume of the material based on a first generative adversarial network and a second generative adversarial network, wherein the set of images depict a microstructure of the volume of material and wherein a first subset of set of images is generated by the first generative adversarial network and a second subset of the set of images is generated by the second adversarial network using the first subset as an input; and
    determining, by a machine learning model, one or more material properties of the volume of the material, wherein the set of images are provided as an input to the machine learning model.

2. The method of claim 1, wherein determining the set of locations for the set of spheres comprises:
    selecting a set of initial locations for the spheres within the volume of the material, wherein the set of initial locations are selected non-deterministically.

3. The method of claim 2, wherein determining the set of locations for the set of spheres comprises:
    displacing one or more spheres from the one or more initial locations to one or more different locations based on one or more overlaps between the one or more spheres.

4. The method of claim 2, wherein determining the set of locations for the set of spheres comprises:
    displacing one or more spheres from the one or more initial locations towards a central portion of the volume of the material.

5. The method of claim 2, wherein determining the set of locations for the set of spheres comprises:
    disposing a sphere from the set of spheres between two or more other spheres from the set of spheres.

6. The method of claim 1, wherein each image in the second subset of images is generated based on a previously generated image.

7. The method of claim 6, wherein locations of the additional material in a current image are based on the previous locations of the additional material in the previously generated image.

8. The method of claim 1, further comprising:
    providing the set of images to a material generation system, wherein the material generation system determines one or more material properties of the volume of the material.

9. The method of claim 1, wherein:
    the additional materials comprise one or more of binder material and electrolyte material; and
    the set of spheres comprise an active material.

10. The method of claim 1, wherein:
    the first generative adversarial network comprises a first conditional generative adversarial network; and
    the second generative adversarial network comprises a second conditional generative adversarial network.

11. The method of claim 1, wherein each image of the set of images depicts a cross section of the volume of the material at a respective depth of the volume of the material.

12. An apparatus, comprising:
a memory configured to store data; and
a processing device coupled to the memory, the processing device configured to:
determine a set of spheres for a volume of a material, wherein:
the volume of the material comprises the set of spheres and additional materials; and
sizes of the set of spheres are based on a Gaussian mixture model (GMM);
determine a set of locations for the set of spheres within the volume of the material;
generate a set of images of the volume of the material based on a first generative adversarial network and a second generative adversarial network, wherein the set of images depict a microstructure of the volume of material and wherein a first subset of set of images is generated by the first generative adversarial network and a second subset of the set of images is generated by the second adversarial network using the first subset as an input; and
determine, based on a machine learning model, one or more material properties of the volume of the material, wherein the set of images are provided as an input to the machine learning model.

13. The apparatus of claim 12, wherein to determine the set of locations for the set of spheres the processing device is to:
select a set of initial locations for the spheres within the volume of the material, wherein the set of initial locations are selected non-deterministically.

14. The apparatus of claim 13, wherein to determine the set of locations for the set of spheres the processing device is to:
displace one or more spheres from the one or more initial locations to one or more different locations based on one or more overlaps between the one or more spheres.

15. The apparatus of claim 13, wherein to determine the set of locations for the set of spheres the processing device is to:
displace one or more spheres from the one or more initial locations towards a central portion of the volume of the material.

16. The apparatus of claim 13, wherein to determine the set of locations for the set of spheres the processing device is to:
dispose a sphere from the set of spheres between two or more other spheres from the set of spheres.

17. The apparatus of claim 12, wherein each image in the second subset of images is generated based on a previously generated image.

18. The apparatus of claim 12, wherein:
the first generative adversarial network comprises a first conditional generative adversarial network; and
the second generative adversarial network comprises a second conditional generative adversarial network.

19. The apparatus of claim 12, wherein each image of the set of images depicts a cross section of the volume of the material at a respective depth of the volume of the material.

20. A non-transitory computer-readable storage medium including instructions that, when executed by a processing device, cause the processing device to perform operations comprising:
determining a set of spheres for a volume of a material, wherein:
the volume of the material comprises the set of spheres and additional materials; and
sizes of the set of spheres are based on a Gaussian mixture model (GMM);
determining a set of locations for the set of spheres within the volume of the material;
generating a set of images of the volume of the material based on a first generative adversarial network and a second generative adversarial network, wherein the set of images depict a microstructure of the volume of material and wherein a first subset of set of images is generated by the first generative adversarial network and a second subset of the set of images is generated by the second adversarial network using the first subset as an input; and
determining, based on a machine learning model, one or more material properties of the volume of the material, wherein the set of images are provided as an input to the machine learning model.

* * * * *